US007004065B2

(12) United States Patent
Roth

(10) Patent No.: US 7,004,065 B2
(45) **Date of Patent: *Feb. 28, 2006**

(54) APPARATUS FOR TREATING AMMONIATED MEATS

(75) Inventor: Eldon Roth, Dakota Dunes, SD (US)

(73) Assignee: Freezing Machines, Inc., Dakota Dunes, SD (US)

(*) Notice: Subject to any disclaimer, the term of this patent is extended or adjusted under 35 U.S.C. 154(b) by 119 days.

This patent is subject to a terminal disclaimer.

(21) Appl. No.: 10/662,616

(22) Filed: Sep. 15, 2003

(65) Prior Publication Data

US 2004/0067287 A1 Apr. 8, 2004

Related U.S. Application Data

(60) Continuation of application No. 10/173,955, filed on Jun. 18, 2002, which is a continuation-in-part of application No. 09/579,783, filed on May 26, 2000, now Pat. No. 6,406,728, which is a division of application No. 09/286,699, filed on Apr. 6, 1999, now Pat. No. 6,142,067.

(51) Int. Cl.
*A23L 1/00* (2006.01)

(52) U.S. Cl. .......................................... 99/534; 99/510

(58) Field of Classification Search .......... 99/325–331, 99/348, 516, 467, 468, 472, 484, 485–492, 99/493, 510, 534–536; 241/38–43, 62, 95, 241/301, 292, 299; 426/231, 646, 319, 332, 426/518, 630, 632–634, 656, 807; 366/132, 366/140–142

See application file for complete search history.

(56) References Cited

U.S. PATENT DOCUMENTS

| | | | |
|---|---|---|---|
| 2,711,373 | A | 6/1955 | Coleman et al. |
| 3,023,109 | A | 2/1962 | Hines |
| 3,119,696 | A | 1/1964 | Williams |
| 3,681,851 | A | 8/1972 | Fleming |
| 3,711,392 | A | 1/1973 | Metzger |
| 3,875,310 | A | 4/1975 | Rawlings et al. |
| 4,107,262 | A | 8/1978 | Leuders et al. |
| 4,419,414 | A | 12/1983 | Fischer |
| 4,919,955 | A | 4/1990 | Mitchell |
| 5,082,679 | A | 1/1992 | Chapman |
| 5,393,547 | A | 2/1995 | Balaban et al. |
| 5,405,630 | A | 4/1995 | Ludwig |
| 5,433,142 | A | 7/1995 | Roth |
| 5,558,774 | A | 9/1996 | Tonelli et al. |

(Continued)

FOREIGN PATENT DOCUMENTS

GB 1223159 2/1971

(Continued)

OTHER PUBLICATIONS

Author unknown, "Mott Spager Application; pH Control—Neutralizing Alkaline Solutions," Mott Industrial, Division of Mott Corporation, Feb. 1996.

(Continued)

*Primary Examiner*—Timothy F. Simone
(74) *Attorney, Agent, or Firm*—Russell D. Culbertson; The Culbertson Group, P.C.

(57) ABSTRACT

An initial comminuted meat (21) is exposed to ammonia to produce an ammoniated meat product. The ammoniated meat product is further comminuted in a comminuting device (12) to produce a further comminuted meat product (22). The ammonia exposure to the original comminuted meat product (21) is controlled to result in a pH of at least around 6.0 in the further comminuted meat product (22).

20 Claims, 3 Drawing Sheets

U.S. PATENT DOCUMENTS

| | | | | |
|---|---|---|---|---|
| 5,564,332 | A | 10/1996 | Ludwig | |
| 5,762,993 | A | 6/1998 | Gundlach et al. | |
| 5,772,721 | A | 6/1998 | Kazemzadeh | |
| 5,853,576 | A | 12/1998 | Kapulnik et al. | |
| 5,858,283 | A | 1/1999 | Burris | |
| 5,871,795 | A | 2/1999 | Roth | |
| 6,142,067 | A * | 11/2000 | Roth | 99/534 |
| 6,387,426 | B1 | 5/2002 | Roth | |
| 6,389,838 | B1 | 5/2002 | Roth | |
| 6,406,728 | B1 * | 6/2002 | Roth | 426/263 |
| 6,564,700 | B1 | 5/2003 | Roth | |
| 2003/0017252 | A1 | 1/2003 | Roth | |

FOREIGN PATENT DOCUMENTS

| | | | |
|---|---|---|---|
| JP | 58047429 | A | 3/1983 |
| JP | SHO62196082 | | 2/1989 |
| JP | 03004737 | A | 1/1991 |
| SU | 2081186/13 | | 12/1976 |
| WO | EP93/00488 | | 9/1993 |

OTHER PUBLICATIONS

Author unknown, "A Guide To Advanced Steam Sparging," Mott Industrial, Division of Mott Corporation, Feb. 1996.

Author unknown, "Sparging/Gas-Liquid Contacting Design Guide & Part Selection," Mott Industrial, Division of Mott Corporation, Feb. 1996.

* cited by examiner

APPARATUS FOR TREATING AMMONIATED MEATS

CROSS-REFERENCE TO RELATED APPLICATIONS

This application is a continuation application of U.S. patent application Ser. No. 10/173,955, filed Jun. 18, 2002, entitled "APPARATUS AND METHOD FOR EXPOSING COMMINUTED FOODSTUFF TO A PROCESSING FLUID", which is a continuation-in-part application of U.S. patent application Ser. No. 09/579,783, filed May 26, 2000, entitled "METHOD FOR TREATING AMMONIATED MEATS," now U.S. Pat. No. 6,406,728, which is a divisional application of U.S. patent application Ser. No. 09/286,699, filed Apr. 6, 1999, entitled "APPARATUS FOR TREATING AMMONIATED MEATS," now U.S. Pat. No. 6,142,067. The entire contents of the disclosure in U.S. Pat. No. 6,142,067 are hereby incorporated herein by this reference.

TECHNICAL FIELD OF THE INVENTION

The invention relates to meat processing and, more particularly, to an apparatus for improving the quality of meats which have been exposed to ammonia.

BACKGROUND OF THE INVENTION

Meat is inevitably exposed to microbes as the material is processed or handled. Microbes are part of the natural decay process of organic material and are commonly deposited on meat by contact between the meat and contaminated equipment or other material. Microbes may also be airborne. Although some microbes may be relatively benign, others contribute to spoilage and some can cause serious illness. Lactic acid producing bacteria are examples of benign microbes, while some strains of *E. Coli, Salmonella, Listeria*, and Staph bacteria are examples of pathogenic microbes which can cause serious illness when ingested by humans.

Even with careful processing practices, meat may be exposed to pathogenic microbes during processing or initial handling. However, the risk of illness from dangerous microbes which may be present in meat is reduced by careful handling and cooking. In larger cuts of meat for example, dangerous microbes may only be present on the surface of the meat and are readily killed in the cooking process.

Comminuted and mixed meats, including ground beef, require more thorough cooking in order to kill dangerous microbes which may be present in the material. The reason for this is that dangerous microbes residing at the surface of a larger piece of meat may be distributed throughout the final comminuted product as the large piece is ground or otherwise cut into smaller pieces and mixed with other pieces. Thorough cooking is required in order to kill microbes residing in the center of a mass of comminuted meat.

Even though the risk from microbes residing in meat is reduced by proper cooking, it is desirable to control the growth of pathogenic microbes and reduce pathogenic microbe content in meat. Various methods have been developed for improving the quality of meat by reducing or controlling pathogenic microbe content in the material. U.S. Pat. No. 5,871,795, to the inventor of the present invention, discloses a method using ammonia to modify the pH of meat. The ammonia treatment disclosed in U.S. Pat. No. 5,871,795 has been shown to decrease pathogenic microbe content in meat, and to inhibit pathogenic microbe growth after treatment.

While the ammoniated (ammonia treated) meat does exhibit decreased pathogenic microbe content, excessive ammonia exposure may have adverse effects on the product. For example, portions of the meat being treated may be overexposed to ammonia while other portions of the meat may be exposed to very little or none of the ammonia. The overexposed portions may absorb sufficient ammonia to affect the taste of the meat and to produce a residual ammonia odor. Underexposed portions of the meat may not exhibit the desired pathogenic microbe inhibiting effect.

SUMMARY OF THE INVENTION

It is an object of the invention to provide an apparatus for improving the quality of ammoniated meats. More particularly, it is an object of the invention to provide an apparatus for ensuring a more even pH increase throughout an ammoniated, comminuted meat.

The method according to the invention includes exposing at least a portion of a quantity of comminuted meat to ammonia. After exposing at least a portion of the comminuted meat to ammonia, the meat is further comminuted. Further comminuting the meat after ammonia exposure produces a meat having much more even ammonia distribution. This more even distribution eliminates residual ammonia odor and produces a consistently better tasting comminuted meat. Also, it is believed that the evenly distributed ammonia produces a more consistent microbe inhibiting effect throughout the volume of the further comminuted meat.

Meats which may be treated according to the invention include beef, pork, lamb, and other red meats. Also, for purposes of this disclosure and the following claims "meat" may comprise or include poultry or seafood. The invention is not limited to any particular fat content in the meat being treated. However, fat content may affect the amount of ammonia which may be added to the original or initial comminuted meat. Also, the meat being treated may include various additives or fillers which are added either before or after the ammonia exposure.

As used in this disclosure and the following claims, a "comminuted" material comprises generally a material which has been cut into relatively smaller pieces from one or more relatively larger pieces. The meat being treated may be originally comminuted by any suitable device such as grinder or bowl chopper. Regardless of the manner in which the original or initial material is comminuted, the size of the individual pieces in the initial comminuted meat may preferably have a maximum dimension of between two (2) inches and three-eighths (3/8) of an inch.

The step of further comminuting the meat after exposure to ammonia is preferably performed with a grinder, but may be performed with any suitable comminuting device such as a bowl chopper, for example. The maximum dimension of the individual pieces in the further comminuted meat may preferably be no greater than three-sixteenths (3/16) of an inch.

The step of exposing the comminuted meat to ammonia may be performed with any suitable ammonia contacting device or arrangement. For example, a pump-type device such as that shown in U.S. Pat. No. 5,871,795 may be used to perform the ammonia exposing step according to the invention. In this pump-type device, ammonia gas is injected or otherwise directed into the pump cylinder along with the meat to be treated. The ammonia is then compressed and pumped together with the meat into a conduit which carries the ammoniated meat to further processing equipment. In this arrangement the pump cylinder or other container where ammonia is injected represents a contact container.

In the preferred form of the invention, however, the ammonia contacting arrangement includes an elongated contacting or contact conduit having a chamber mounted in its interior. In this arrangement the contact conduit represents a contact container. The chamber includes a number of openings which extend from an interior area of the chamber to the interior of the contacting conduit. The openings represent pH increasing material inlets in the contact container. Also, the chamber includes an ammonia supply tube which supplies ammonia to the interior area of the chamber. The annular area between the chamber and the inner wall of the contacting conduit preferably has a dimension no greater than the maximum dimension of the pieces of original or initial comminuted meat being treated. In one preferred form of the invention, the distance between the inner wall of the contact conduit and the outer surface of the chamber is between one-half (½) of an inch and one-eighth (⅛) of an inch.

These and other objects, advantages, and features of the invention will be apparent from the following description of the preferred embodiments, considered along with the accompanying drawings.

DESCRIPTION OF PREFERRED EMBODIMENTS

Figure 1:
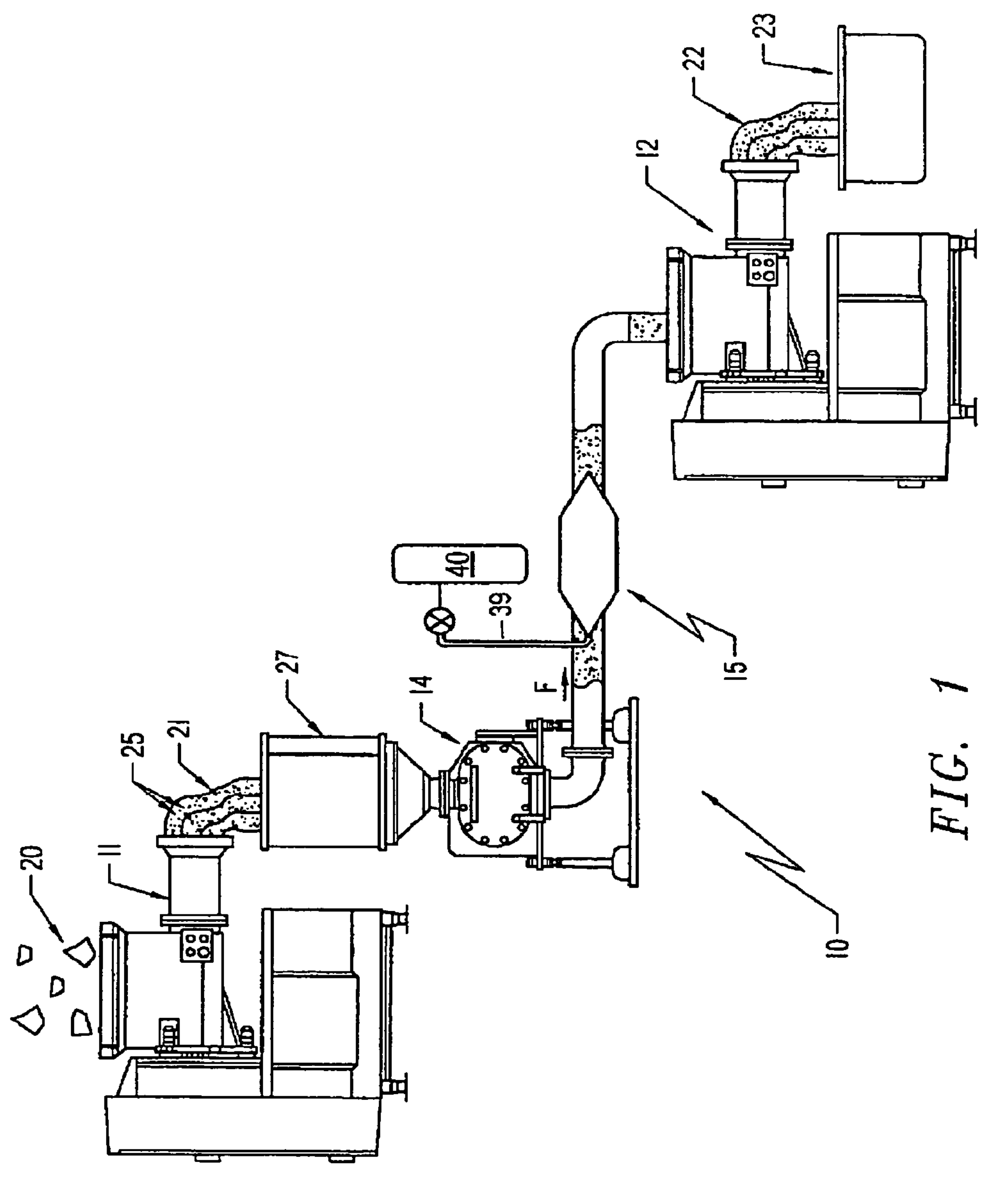
FIG. 1 is a somewhat diagrammatic side view of a treatment apparatus embodying the principles of the invention, partially broken away to show the ammonia contacting arrangement.
Figure 2:
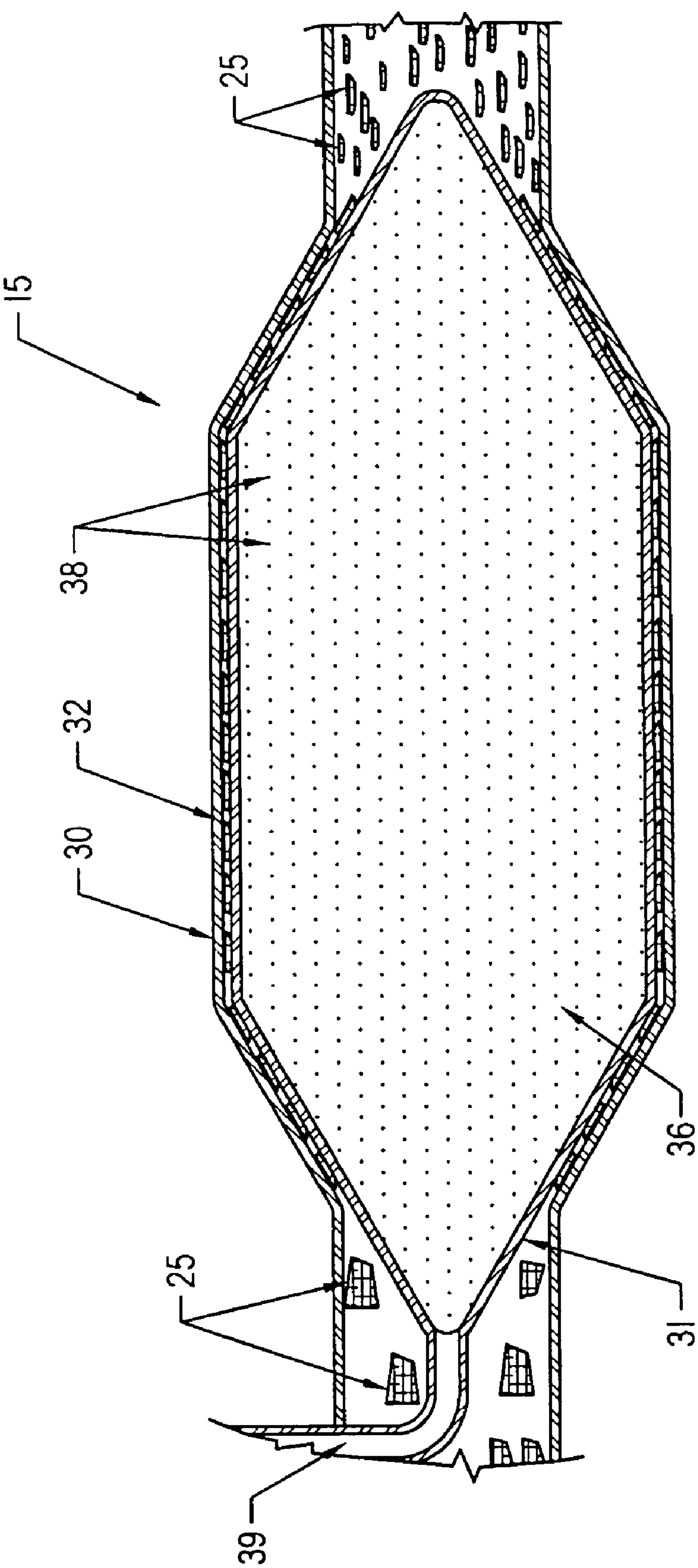
FIG. 2 is an enlarged longitudinal section view through the ammonia contacting arrangement shown in FIG. 1.
Figure 3:
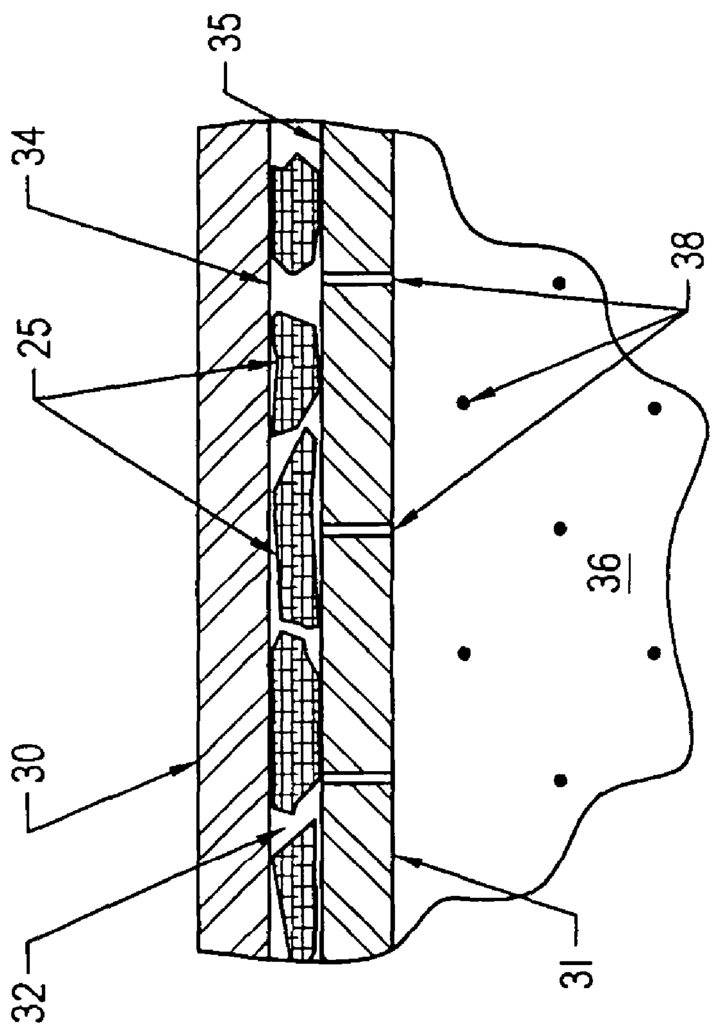
FIG. 3 is an enlarged, longitudinal section view through a portion of the ammonia contacting arrangement shown in FIG. 1.

FIGS. 1 through 3 illustrate one preferred form of treatment apparatus 10 embodying the principles of the invention. Treatment apparatus 10 includes an initial comminuting device 11 and a further comminuting device 12. Also, treatment apparatus 10 includes a displacement device or pump 14 and an ammonia contacting arrangement shown generally at reference numeral 15.

Both of the comminuting devices 11 and 12 in this form of the invention comprise grinders such as the Model No. 1109 grinder by Weiler & Company, Inc. Although not shown in the drawings, each grinder 11 and 12 includes an auger which is driven by a suitable motor to force material against a grinder plate having a plurality of grinder openings. The end of the auger adjacent to the grinder plate includes one or more blades which each pass over the surface of the grinder plate to cut material which has entered the grinder plate openings. These smaller pieces of material which have been cut as the grinder blades pass over the grinder plate are eventually displaced through the respective grinder plate openings and exit the grinder.

Grinder 11 receives relatively large pieces of meat 20 and produces the initial or original comminuted meat 21. In one form of the invention, the grinder plate associated with grinder 11 includes openings having a maximum dimension preferably between two (2) inches and three-eighths (⅜) of an inch. In a more preferred form of the invention, the grinder plate openings in grinder 11 have a maximum dimension of between one-half (½) of an inch to three-eighths (⅜) of an inch. The maximum dimension of the openings in the grinder plate generally determines the maximum dimension of the individual pieces of comminuted material exiting the grinder.

It will be appreciated that the original comminuted product 21 exiting grinder 11 is made up of a plurality of discrete pieces arranged together in a continuous mass. Individual pieces are represented in the drawings at reference numeral 25. Since these individual pieces are mixed together with other discrete pieces they are not necessarily visible individually from the collective mass of material. However, the discrete pieces 25 are shown for purposes of explaining the operation of the invention.

Grinder 12 receives the original comminuted meat after the material has been exposed to ammonia in the ammonia contacting arrangement 15. Preferably, grinder 12 further comminutes the initial comminuted material and includes a grinder plate having openings smaller than the openings in the grinder plate associated with grinder 11. Grinder 12 may include a grinder plate having openings with a maximum dimension of no greater than three-sixteenths (3/16) of an inch and preferably about one-eighth (⅛) of an inch. Alternatively, the grinder plate associated with grinder 12 may have the same size openings as grinder 11 and still perform some comminuting within the scope of the invention. In any event, the further comminuted material 22 exits grinder 12 and is collected for packaging or for transport to further processing equipment. FIG. 1 shows the further comminuted material 22 being collected in a receiving tub 23.

In the form of the invention shown in FIG. 1, displacement device 14 comprises a suitable positive displacement metering device. Displacement device 14 collects the initial comminuted meat 21 in collection chute 27 and then displaces the initial comminuted meat through the ammonia contacting arrangement 15 as indicated by the flow direction shown at arrow F. Other forms of the invention may use other means for forcing the comminuted meat into and through the ammonia contacting arrangement 15. The particular displacement or pumping device will include a motor for driving the device with sufficient power to force the comminuted meat through the ammonia contacting arrangement 15.

FIGS. 2 and 3 show further details of the ammonia contacting arrangement 15 shown in FIG. 1. The arrangement 15 includes a contact conduit 30 which forms a contact container having a chamber 31 positioned therein. The illustrated form of the invention shows chamber 31 positioned coaxially within contact conduit 30, although the chamber may be mounted eccentrically in the contacting conduit within the scope of the invention. As shown best in FIG. 3, the coaxial arrangement leaves a uniform annular space 32 between the inner wall 34 of the contacting conduit 30 and the outer surface 35 of chamber 31. Chamber 31 also includes an interior area 36 and a plurality of openings 38 which extend from the chamber interior area to the annular space 32 between the contacting conduit inner wall 34 and the chamber outer surface 35. The openings may be one thousandth of an inch in diameter or greater. Finally, the ammonia contacting arrangement 15 includes a supply tube 39 which is connected to feed ammonia from a supply 40 to the chamber interior area 36.

The form of the chamber 31 illustrated in the figures includes openings 38 which have been drilled or otherwise machined through the chamber wall. Other forms of the invention may include a chamber having walls made of a sintered material. The sintered walls in this preferred form of the invention are permeable to the ammoniating material.

In still other forms of the invention, the contacting conduit wall may include machined openings or sections of sintered material. An annular supply chamber may be located around the contact conduit or contact container for containing an ammoniating material. This additional ammonia contacting arrangement may be used instead of, or in addition to, the inner chamber form of the invention which uses chamber 31 shown in the figures.

Where the invention employs an inner chamber such as chamber 31, the distance between the contacting conduit inner wall 34 and the chamber outer surface 35 may be any distance which will allow the initial comminuted meat 21 to be displaced through the annulus without substantially damaging the meat. For example, the width of the annulus may be around two inches. A preferred width of the annulus is between one-half (½) to one-eighth (⅛) of an inch.

The treatment process according to the invention may now be described with reference to FIGS. 1 through 3. Referring to FIG. 1, meat 20 is ground or otherwise comminuted to form the initial comminuted meat 21. This comminuted meat is collected in displacement device chute 27 and forced by displacement device 14 through the ammonia contacting arrangement 15. In the ammonia contacting arrangement 15, at least a portion of the comminuted meat 21 is exposed to ammonia (ammoniated). The ammoniated meat passes from the ammonia contacting arrangement to grinder 12 where the material is preferably further comminuted. The further comminuted meat 22 is expelled from device 12 and collected for packaging or for further processing.

In the ammonia contacting arrangement 15 shown in the figures, an individual layer of comminuted meat pieces 25 passes through the annular space 32. The pieces 25 are exposed to ammonia on at least one surface as that surface passes over an opening 38 in chamber 31. Also, some ammonia may flow from chamber 31 into the comminuted material as it passes. The ammonia in chamber 31 may be in a gaseous form or may be in a solution with water. That is, may be an ammonia-based pH increasing material. Other ammoniating materials may be used instead of gaseous or aqueous ammonia. In any event, the pressure in chamber 31 is controlled so that the pH of the further comminuted meat 22 is at least about 6.0, or in the range from 6.0 to 11.0. According to the invention, the pH of the further comminuted material 22 is substantially consistent throughout the mass of material and is not subject to significant variation throughout the material.

The meat may be processed according to the invention in a wide temperature range. For example, the meat may be maintained at a temperature above 32° F. for both the ammonia contacting step and the further comminuting step. In any event, the meat temperature should be high enough that some liquid component remains in the meat during the further comminuting step.

The above described preferred embodiments are intended to illustrate the principles of the invention, but not to limit the scope of the invention. Various other embodiments and modifications to these preferred embodiments may be made by those skilled in the art without departing from the scope of the following claims. For example, alternate forms of the invention may include different types of comminuting devices such as bowl choppers. Furthermore, the original comminuting step need not be performed in connection with the ammonia contacting and further comminuting steps, and may be performed by suitable means located at a different site. Also, alternate forms of the invention may use a pump-type ammonia contacting arrangement such as the arrangement described in U.S. Pat. No. 5,871,795. The pump-type arrangement may be used to perform the function of the displacement device 14 and ammonia contacting arrangement 15 shown in the illustrated form of the invention.

What is claimed is:

1. An apparatus for treating comminuted meats, the apparatus including:

(a) a contact container;

(b) a pH increasing material inlet in the contact container;

(c) a supply of ammonia-based pH increasing material connected to the pH increasing material inlet;

(d) a further comminuting device connected to receive comminuted meat from the contact container; and (e) a pump operatively connected to pump comminuted meat from the contact container to the further comminuting device.

2. The apparatus of claim 1 wherein the contact container comprises a conduit through which the comminuted meat is displaced.

3. The apparatus of claim 1 further including a number of additional pH increasing material inlets into the contact container, each additional pH increasing material inlet being operatively connected to the supply of ammonia-based pH increasing material to facilitate the flow of ammonia-based pH increasing material into the contact container.

4. The apparatus of claim 1 wherein the further comminuting device comprises a grinder.

5. The apparatus of claim 1 further including an initial comminuting device operatively connected to form an initial comminuted meat and transfer the initial comminuted meat into the contact container.

6. The apparatus of claim 5 wherein the initial comminuting device comprises a grinder having a first grind size and wherein the further comminuting device comprises a grinder having a second grind size, the second grind size being less than the first grind size.

7. The apparatus of claim 5 wherein the initial comminuting device comprises a grinder having a grind size in the range of approximately one-half (½) inch to approximately three-eighths (⅜) inch and wherein the further comminuting device comprises a grinder having a grind size of no more than approximately three sixteenths (3/16) inch.

8. The apparatus of claim 1 wherein the pH increasing material inlet includes an opening into the contact container having a maximum dimension less than a minimum dimension of the contact container.

9. The apparatus of claim 1 wherein the contact container includes a portion having a comminuted meat flow area defined between a first wall and an opposing second wall, and wherein the dimension between the first wall and second wall is no greater than a grind size associated with the comminuted meat.

10. The apparatus of claim 9 wherein the pH increasing material inlet includes an opening into the contact container through one of the first wall or second wall.

11. The apparatus of claim 1 wherein the further comminuting device comprises a bowl chopper.

12. An apparatus for treating comminuted meats, the apparatus including:

(a) a contact conduit having an inlet opening at a first end and an outlet opening at a second end;

(b) a pH increasing material inlet in the contact conduit;

(c) a supply of ammonia-based pH increasing material connected to the pH increasing material inlet;

(d) a further comminuting device connected to receive material displaced from the contact conduit through the outlet opening thereof; and (e) a displacement device operatively connected to the inlet opening of the contact conduit to facilitate a displacement of comminuted meat into the contact conduit through the inlet opening and through the contact conduit from the inlet opening to the outlet opening.

13. The apparatus of claim 12 further including an inlet conduit operatively connecting the displacement device to the inlet opening of the contact conduit and an outlet conduit operatively connecting the outlet opening of the contact conduit and the further comminuting device.

14. The apparatus of claim 13 further including an initial comminuting device operatively connected to form an initial comminuted meat and supply the initial comminuted meat to the displacement device.

15. The apparatus of claim 14 wherein the initial comminuting device comprises a grinder having a first grind size and wherein the further comminuting device comprises a grinder having a second grind size, the second grind size being less than the first grind size.

16. The apparatus of claim 14 wherein the initial comminuting device comprises a grinder having a grind size in the range of approximately one-half (½) inch to approximately three-eighths (⅜) inch and wherein the further comminuting device comprises a grinder having a grind size of no more than approximately three sixteenths (3/16) inch.

17. An apparatus for treating comminuted meats, the apparatus including:

(a) a contact container;

(b) a pH increasing material inlet in the contact container;

(c) a supply of ammonia-based pH increasing material connected to the pH increasing material inlet; and (d) a further comminuting device; and (e) a material transfer arrangement for transferring comminuted meat from the contact container to the further comminuting device.

18. The apparatus of claim 17 wherein the material transfer arrangement includes an outlet conduit connected to an outlet opening of the contact container and extending to an inlet hopper of the further comminuting device.

19. The apparatus of claim 18 wherein the contact container comprises a contact conduit through which a comminuted meat may be displaced from an inlet opening to the outlet opening.

20. The apparatus of claim 19 wherein:

(a) the contact conduit includes a portion having a comminuted meat flow area defined between a first wall and an opposing second wall;

(b) the dimension between the first wall and second wall is no greater than a grind size associated with the comminuted meat; and (c) the pH increasing material inlet is located in one of the first wall or second wall.

* * * * *